United States Patent
Tanaka et al.

(10) Patent No.: US 10,163,045 B2
(45) Date of Patent: Dec. 25, 2018

(54) ELECTRONIC APPARATUS AND METHOD OF MANAGING STATUS INFORMATION OF THE SAME

(71) Applicants: Kengo Tanaka, Tokyo (JP); Kazushi Takei, Kanagawa (JP); Norio Muraishi, Tokyo (JP); Sumihiro Inokuchi, Kanagawa (JP); Masashi Hommi, Kanagawa (JP); Atsushi Kuramoto, Kanagawa (JP); Takuya Kemmochi, Kanagawa (JP); Yoichi Kitahara, Ishikawa (JP)

(72) Inventors: Kengo Tanaka, Tokyo (JP); Kazushi Takei, Kanagawa (JP); Norio Muraishi, Tokyo (JP); Sumihiro Inokuchi, Kanagawa (JP); Masashi Hommi, Kanagawa (JP); Atsushi Kuramoto, Kanagawa (JP); Takuya Kemmochi, Kanagawa (JP); Yoichi Kitahara, Ishikawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/439,294

(22) Filed: Feb. 22, 2017

(65) Prior Publication Data
US 2017/0270395 A1 Sep. 21, 2017

(30) Foreign Application Priority Data
Mar. 16, 2016 (JP) .................................. 2016-053031

(51) Int. Cl.
*G06K 15/00* (2006.01)
*G06K 15/14* (2006.01)
*G06F 3/12* (2006.01)

(52) U.S. Cl.
CPC ......... *G06K 15/4075* (2013.01); *G06K 15/14* (2013.01); *G06K 15/408* (2013.01)

(58) Field of Classification Search
CPC ........... G03G 21/1892; G03G 15/5058; H04N 1/00002; H04N 1/00015; H04N 1/00023;
(Continued)

(56) References Cited

U.S. PATENT DOCUMENTS

| 6,672,695 B1* | 1/2004 | Naka .................... B41J 2/17503 347/19 |
| 2005/0078969 A1* | 4/2005 | Kikuchi ............. G03G 21/1892 399/12 |

(Continued)

FOREIGN PATENT DOCUMENTS

| JP | 2002-055885 | 2/2002 |
| JP | 2002-207401 | 7/2002 |

(Continued)

*Primary Examiner* — Chad Dickerson
(74) *Attorney, Agent, or Firm* — Harness, Dickey & Pierce, P.L.C.

(57) ABSTRACT

An electronic apparatus to which a removable device can be set is provided. The removable device includes a first memory to store first status information indicating a status of the removable device, first identification information identifying the removable device, and second identification information identifying the electronic apparatus. The electronic apparatus includes a second memory to store second status information indicating a status of the removable device that is set to the electronic apparatus, third identification information identifying the removable device set to the electronic apparatus, and fourth identification information identifying the electronic apparatus, and a processor to determine, when connected to the first memory of the removable device set to the electronic apparatus, whether the first identification information matches the third identification information and the second identification information (Continued)

matches the fourth identification information and update the second status information with the first status information based on a result of the determination.

11 Claims, 5 Drawing Sheets

(58) Field of Classification Search
CPC .......... H04N 1/00031; H04N 1/00045; H04N 1/00053; H04N 1/00063; H04N 1/00087; H04N 1/0009; H04N 1/00965; H04N 1/2315; H04N 1/2346; H04N 1/295; H04N 1/6033; H04N 1/4433; B41J 2/17503; B41J 2/1752; B41J 2/17546; B41J 2/17566; G06K 15/4075; G06K 15/14; G06K 15/408

USPC .......... 399/8–12, 27, 69; 358/1.11–1.18, 1.9, 358/2.1, 1.1; 347/7, 19
See application file for complete search history.

(56) References Cited

U.S. PATENT DOCUMENTS

| 2010/0202788 | A1* | 8/2010 | Suda | .................... G03G 15/553 |
| | | | | 399/27 |
| 2014/0227000 | A1 | 8/2014 | Kitahara | |

FOREIGN PATENT DOCUMENTS

| JP | 2002207401 A * | 7/2002 |
| JP | 2010-181720 | 8/2010 |
| JP | 2014-178669 | 9/2014 |

* cited by examiner

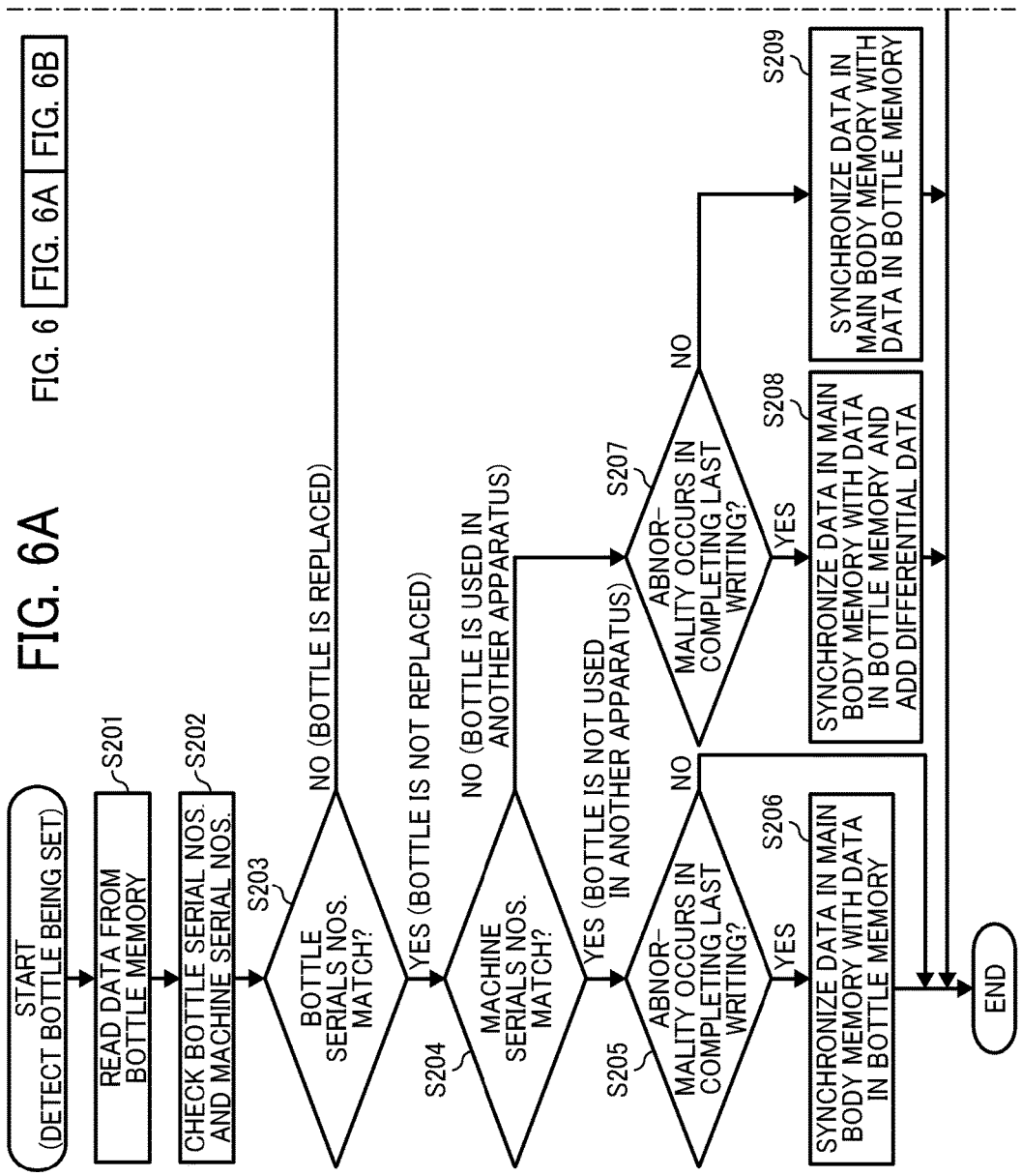

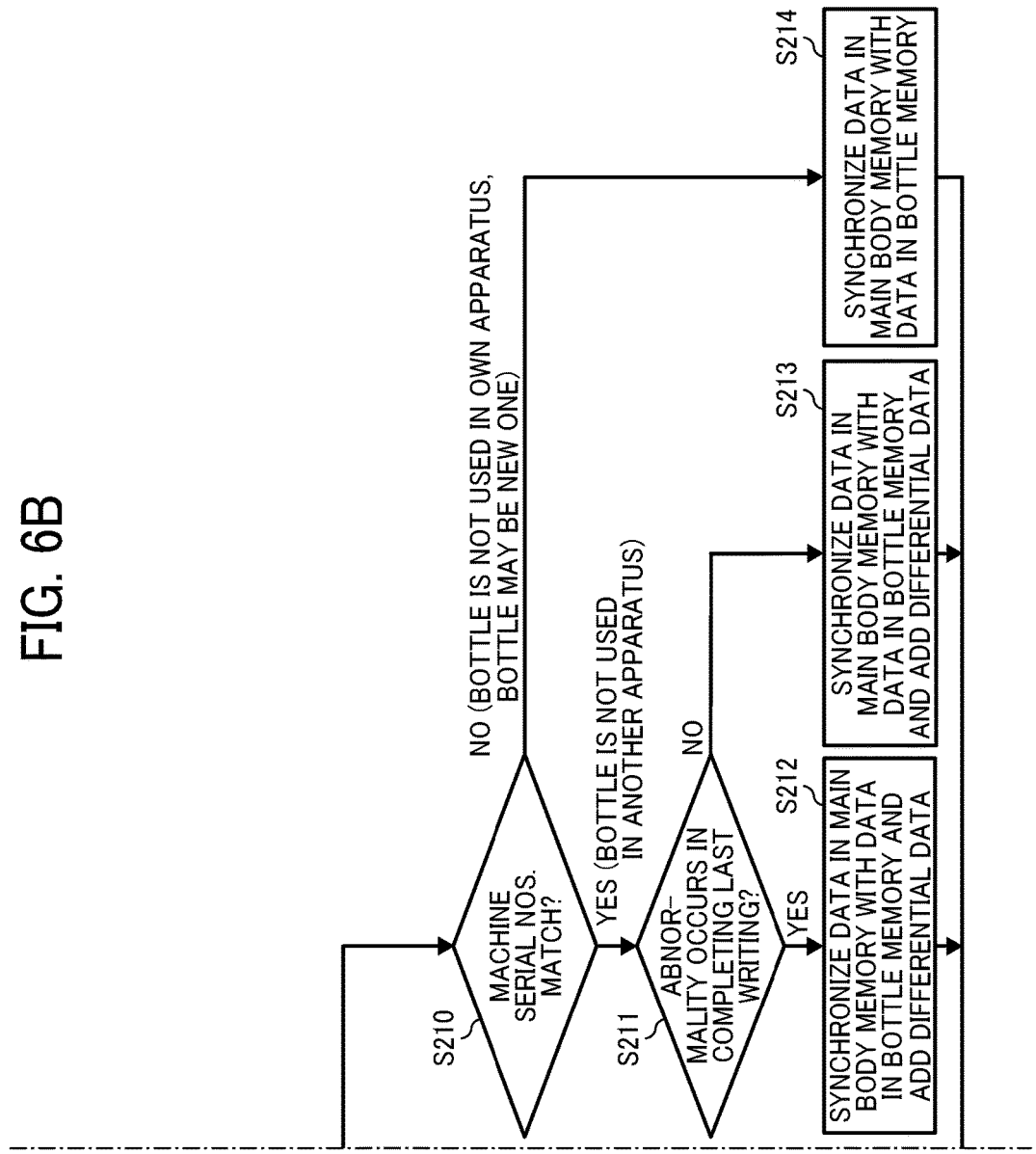

ELECTRONIC APPARATUS AND METHOD OF MANAGING STATUS INFORMATION OF THE SAME

CROSS-REFERENCE TO RELATED APPLICATION

This patent application is based on and claims priority pursuant to 35 U.S.C. § 119(a) to Japanese Patent Application No. 2016-053031, filed on Mar. 16, 2016, in the Japan Patent Office, the entire disclosure of which is hereby incorporated by reference herein.

BACKGROUND

Technical Field

The embodiments of the present disclosure relate to an electronic apparatus and a method of managing status information of the electronic apparatus.

Description of the Related Art

Conventionally, a main body of an electronic apparatus, to which a removable device is detachably attached, has a memory to store status information indicating a status of the removal device. The removable device also has a memory to store status information of the removal device. The status information stored in both of the main body of the electronic apparatus and the removable device is held in an observable status. The electronic apparatus has a function of managing the status information by updating the status information.

An image forming apparatus including a removable toner cartridge (hereinafter simply "cartridge") is one example of the electronic apparatus. The cartridge includes a memory to store information on a remaining amount of toner. A main body of the image forming apparatus includes a memory mirrored to the memory of the cartridge, so that the memories each in the cartridge and the main body of the image forming apparatus have the same information.

In such an image forming apparatus, erroneous writing to the memory, which is a non-volatile memory, in the cartridge may occur when connection between the main body of the image forming apparatus and the cartridge is broken while the image forming apparatus is activated.

SUMMARY

An improved electronic apparatus to which a removable device is set is described. The removable device includes a first memory to store first status information indicating a status of the removable device, first identification information identifying the removable device, and second identification information identifying the electronic apparatus. The electronic apparatus includes a second memory and a processor. The second memory stores second status information indicating a status of the removable device that is set to the electronic apparatus, third identification information identifying the removable device set to the electronic apparatus, and fourth identification information identifying the electronic apparatus. The processor determines, when connected to the first memory of the removable device set to the electronic apparatus, whether the first identification information matches the third identification information and the second identification information matches the fourth identification information. Based on the result of that determination, the processor updates the second status information with the first status information.

Also disclosed is an improved method of managing status information of the electronic apparatus.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings;

FIGS. 6A and 6B are a flowchart illustrating details of the process of data synchronization of FIG. 4.

DETAILED DESCRIPTION

Figure 1:
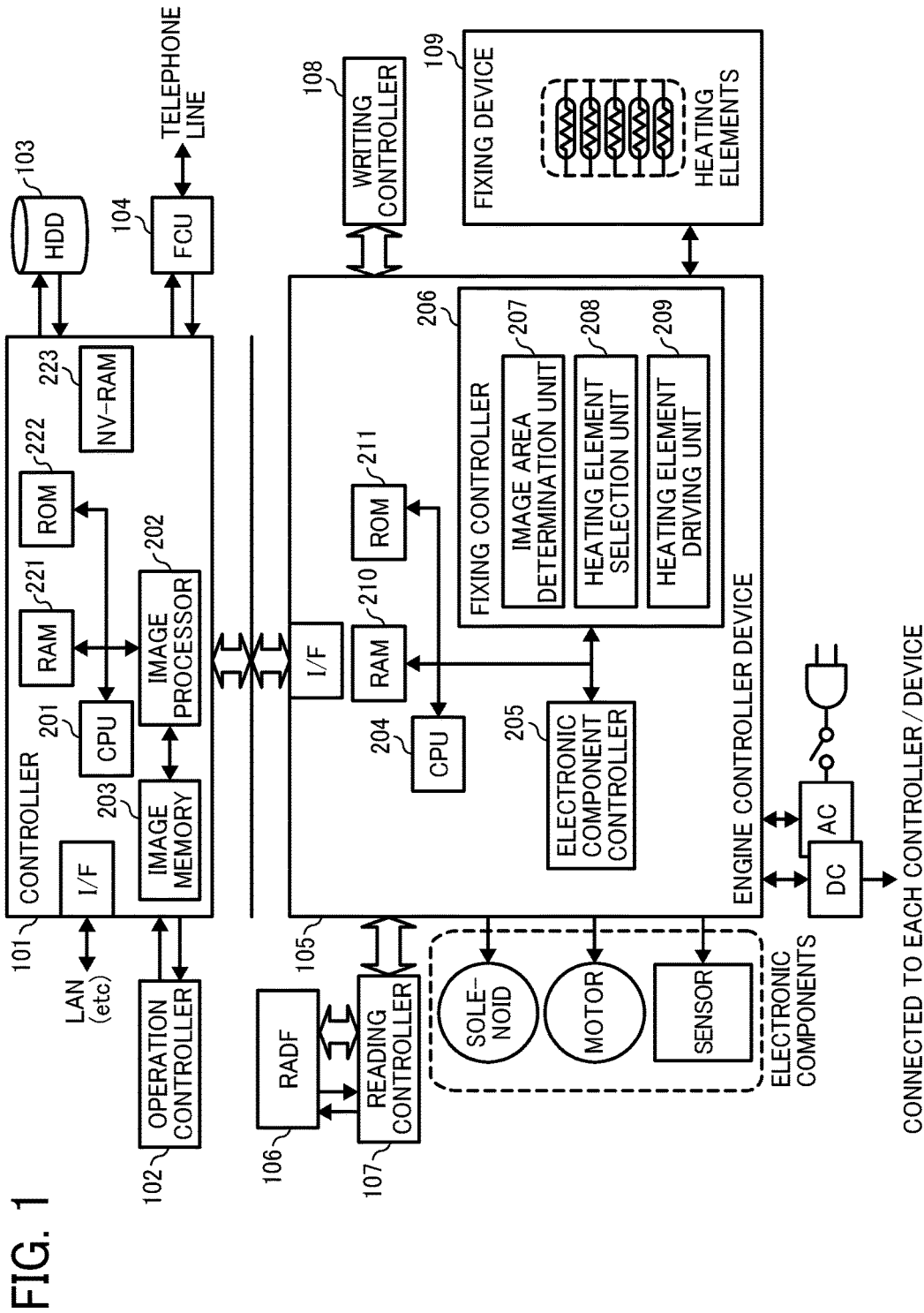
FIG. 1 is a diagram illustrating a basic configuration of an image forming apparatus, which is one example of an electronic apparatus according to one embodiment.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

FIG. 1 is a block diagram illustrating a basic configuration of an image forming apparatus, which is one example of an electronic apparatus according to one embodiment.

The image forming apparatus of FIG. 1 includes a multifunction peripheral (MFP), which is a digital copying machine, having multiple functions such as a printer, a copier, a scanner, a facsimile communication device, etc. in one body. As a control system, the image forming apparatus includes a controller 101, an engine controller device 105, an operation controller 102, a reading controller 107, a writing controller 108, a plotter, and a power supply. The controller 101 includes an image processor 202 that forms an image in response to an instruction received with the operation controller 102. The engine controller device 105 is connected to an alternating current (AC) power supply and a direct current (DC) power supply, which supplies power to each device, to drive a printer engine. The reading controller 107 operates in conjunction with a reverse automatic document feeder (RADF) 106 to read a document according to a control instruction received from the engine controller device 105. The writing controller 108 receives image data and writes the image data to form an image.

The controller 101, more specifically, sets a user interface (UI), sets a mode, and causes an application such as a copy application and a printer application to form an image. The controller 101 includes a central processing unit (CPU) 201, the image processor 202, an image memory 203, a read only memory (ROM) 222, a random access memory (RAM) 221, and a non-volatile random access memory (NV-RAM) 223. The CPU 201 performs various types of processing. The image processor 202 is configured mainly as an application specific integrated circuit (ASIC) and performs the image forming operation. The image memory 203 stores data processed for the image forming operation. The ROM 222 stores control programs in a manner that the programs are kept even after the power is turned off, and the RAM 221 stores various types of information temporarily. The NV-RAM 223 stores configuration information for one or more operation conditions of the MFP. The controller 101 is connected to the operation controller 102 serving as a UI, a hard disc drive (HDD) 103, and a facsimile control unit (FCU) 104. The controller 101 includes a local area network (LAN) interface, which sends and receives information to and from external devices via a network such as a LAN. The HDD 103 stores data to be used for various processing. The FCU 104 is connected to a phone line. Additionally, the controller 101 is connected to the engine controller device 105 to communicate via an interface or the like, using a peripheral component interface (PCI) bus. That is, the controller 101 receives the instructions for the image forming operation from the operation controller 102 or the external devices via the LAN interface and performs the image forming operation based on the instructions to form an image, and then sends the image to the engine controller device 105 via the PCI bus.

The engine controller device 105 includes a CPU 204, an electronic component controller 205, a fixing controller 206, a RAM 210, and a ROM 211. The CPU 204 mainly performs various types of processing. The electronic component controller 205, configuring with, for example, the ASIC, controls various electronic components such as a solenoid, a motor, and a sensor. The fixing controller 206 is connected to a fixing device 109 including a plurality of heating elements, and monitors temperature of the fixing device 109 and controls the plurality of heating elements. The RAM 210 stores various information temporarily, and the ROM 211 stores control programs in a manner that the programs are kept even after the power is turned off. The fixing controller 206 includes an image area determination unit 207 that determines an image area based on image information received from the controller 101, a heating element selection unit 208 that selects which heating elements of the plurality of heating elements to drive, and a heating element driving unit 209 that heats the heating elements selected from the plurality of heating elements with the heating element selection unit 208. The fixing controller 206 also includes a sensor to monitor temperature of the plurality of heating elements. Here, the image area determination unit 207 is provided in the engine controller device 105, however the embodiment is not limited to this, but the image area determination unit 207 may be provided in the image processor 202 of the controller 101 and report a result of determination to the engine controller device 105.

The reading controller (scanner) 107 includes a scanner board unit (SBU) that controls inputs and outputs (I/O) of the scanner and performs image transfer, and reads an image of a document sheet set by a user, using a charge coupled device (CCD), by controlling the electronic components including the solenoid, the motor, and the sensor. The reading controller 107 then sends the image to image processing units of the controller 101 and the engine controller device 105 via the PCI bus. The writing controller 108 sends the image data received from the controller 101 or the reading controller 107 via the PCI bus to a laser diode (LD) unit, which performs image forming, and a luminescent diode (LED unit) to write a pattern of the image data to a sheet for a printing operation and a copying operation.

The image forming apparatus also performs a scanner operation by sending an image read with the reading controller 107 to the controller 101 via the engine controller device 105 using the PCI bus and then transferring the image to a personal computer (PC) or the like via the LAN interface. The plurality of heating elements included in the fixing device 109 are, for example such as thermal heads, and aligned in a main scanning direction in the fixing device 109.

Figure 2:
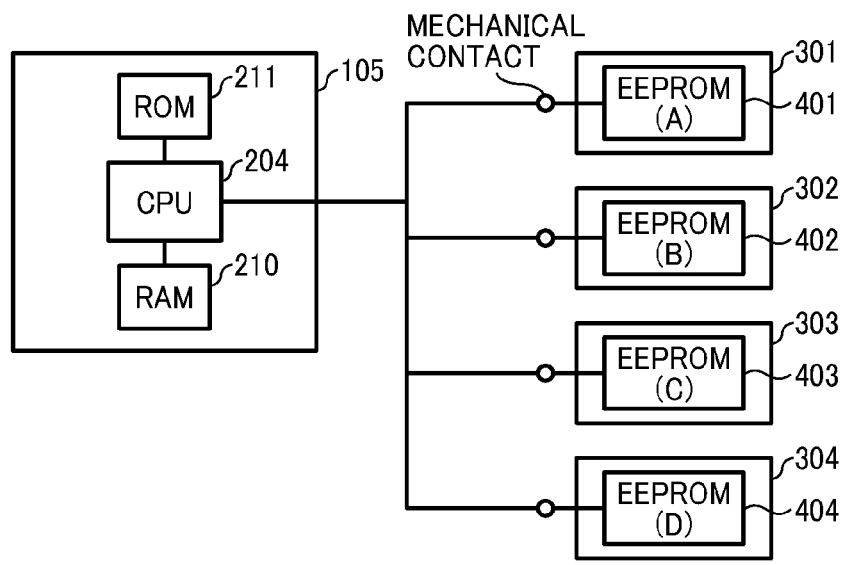
FIG. 2 is a schematic diagram illustrating a connection configuration between toner bottles and an engine controller device of the image forming apparatus of FIG. 1.

FIG. 2 is a schematic diagram illustrating a connection configuration between the engine controller device 105 described above and toner bottles 301-304, which are toner cartridges.

Each of the toner bottles 301-304 is filled with liquid toner used for printing. The toner bottles 301-304 are connected to the CPU 204 by a mechanical contact and a harness connection. The CPU 204 is connected to the ROM 211, which is a nonvolatile memory and stores the control programs in the engine controller device 105, and the RAM 210, which is a nonvolatile memory and used when the engine controller device 105 performs control processing. The ROM 211 may include a flash ROM or a plurality of electrically erasable programmable read-only memories (EEPROMs). Each of the toner bottles 301-304 include a circuit board configuration that is implemented with an EEPROM, which is a nonvolatile memory. Referring to FIG. 2, the toner bottles 301-304 respectively have an EEPROM (A) 401, an EEPROM (B) 402, an EEPROM (C) 403, and an EEPROM (D) 404 as a circuit board configuration. Each of the EEPROM (A) 401, the EEPROM (B) 402, the EEPROM (C) 403, and the EEPROM (D) 404 stores data including information on the remaining amount of toner and an identifier that, for example, identifies the corresponding one of the toner bottles 301-304. Each of the toner bottles 301-304 is connected to the main body of the image forming apparatus (hereinafter simply "main body") by the mechanical contact, and connected to the CPU 204 by the harness connection. In the description of the embodiment here, the image forming apparatus is assumed to have a color printing function, and thus has four circuit board configurations, however the embodiment is not limited to this, but one circuit board configuration may also be used for the image forming apparatus that has a monochrome printing function.

The mechanical contact at a point where each of the toner bottles 301-304 is connected to the main body may be susceptible to a contact failure due to vibration or toner scattering. A contact failure occurring during communication between the engine controller device 105 and one or more of the toner bottles 301-304 may cause an error in writing data to corresponding one or more of the EEPROM (A) 401, the EEPROM (B) 402, the EEPROM (C) 403, and the EEPROM (D) 404, each of which serves as a memory of the corresponding one or more of the toner bottles 301-304.

To cope with this eventuality, data in the RAM 210, which is the memory in the main body, is mirrored to the data in the EEPROM (A) 401, the EEPROM (B) 402, the EEPROM (C) 403, and the EEPROM (D) 404, each of which is the memory of the corresponding one of the toner bottles 301-304, to prevent the data loss due to the contact failure.

In the image forming apparatus according to the embodiment, the toner bottles 301-304 each include the circuit board configuration implemented with the memory that stores information including the information on the remaining amount of toner. The toner bottles 301-304 are removable by the user. The CPU 204 in the engine controller device 105 can access the memory in each of the toner bottles 301-304 to send and receive information. The CPU 204, accordingly, can detect whether the one or more of the toner bottles 301-304 are removed and returned to be set, or connected, and determine whether the one or more of the toner bottles 301-304 that are removed and returned to be set, or connected, are used in other apparatuses during their removal. Through this, the CPU 204 is able to operate appropriately based on correct data obtained from the determination described above, even when a result of the determination that is data inconsistency indicates that the one or more toner bottles 301-304 are used in another apparatus during their removal from the first apparatus.

Regarding the determination of the CPU 204 described above, the CPU 204 checks data, more specifically, it compares the data in the RAM 210 (hereinafter, may be referred to as a memory in the main body side, or a main body memory) with the data in the memory in the corresponding one or more of the toner bottles 301-304 (hereinafter, may be referred to as, collectively, a memory in the bottle side, or a bottle memory) to determine whether the data is the same in both memories.

Figure 3:
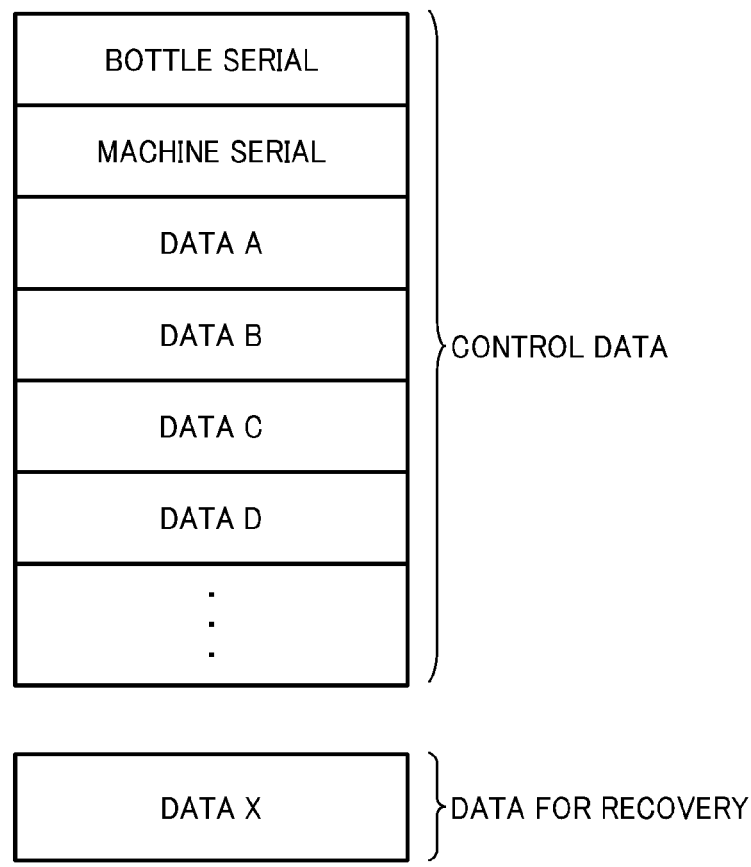
FIG. 3 is a schematic diagram illustrating a configuration of data used by the engine controller device of the image forming apparatus of FIG. 1 and the toner bottles in FIG. 2 to control toner.

FIG. 3 is a schematic diagram illustrating a configuration of data used by the engine controller device 105 of the image forming apparatus described above and the toner bottles 301-304 to control the toner.

The memory in the main body side, which is the RAM 210 in the engine controller device 105, and the memory in the bottle side, which includes the EEPROM (A) 401, the EEPROM (B) 402, the EEPROM (C) 403, and the EEPROM (D) 404, store control data in common. As illustrated in FIG. 3, the control data stored commonly in both the memories in main body side and the bottle side includes bottle serial number, machine serial number, data A, data B, data C, data D, etc. Beside the control data, the memory in the main body side, which is the RAM 210 of the engine controller device 105, stores data X, illustrated in FIG. 3, in an area that is different from an area where the control data is stored. The data X is data that fails to be written in the memory in the bottle side due to abnormality occurring in writing to the memory in the bottle side. That is, the data X fails to be reflected in the memory in the bottle side but remains in the memory in the main body side as data for recovery. In the description, the data X may be referred to as unreflected data or recovery data.

In the embodiment, the control data includes the machine serial number in addition to the bottle serial number and the remaining amount of toner, which are conventionally used. The machine serial number and the bottle serial number are identification information and the remaining amount of toner is status information. The bottle serial number identifies a corresponding one of the toner bottles 301-304. The machine serial number identifies the main body of the image forming apparatus. That is, the machine serial number in the memory in the bottle side identifies to which image forming apparatus the toner bottles 301-304 are last-set to be used. The machine serial number stored in the memory in the bottle side is updated when the corresponding one or more of the toner bottles 301-304 are set to the image forming apparatus or other apparatus. The memory in the bottle side accordingly stores last-updated information, that is, the toner bottles 301-304 can have the last-updated information. When the machine serial number in the main body memory matches the machine serial number in the bottle memory in setting of the corresponding one or more of the toner bottles 301-304 to the main body, this means the corresponding one or more of the toner bottles 301-304 have not been used in another apparatus during their removal. In contrast, when the machine serial number in the main body memory does not match the machine serial number in the bottle memory, in setting of the corresponding one or more of the toner bottles 301-304 to the main body, this means the corresponding one or more of the toner bottles 301-304 have been used in another apparatus during their removal.

Additionally, when the memory in the bottle side fails to be updated due to the malfunction in the writing, the data of the memory in the main body side and the data in the memory in the bottle side become inconsistent. At this time, the unreflected data X is kept in the memory in the main body side. The unreflected data X is used to correct the data inconsistency when the faulty connection (communication) is fixed by resetting the corresponding one or more toner bottles 301-304. The data X is data for recovery, and the RAM 210 stores the data X in an area that is different from the area where the control data is stored. The RAM 210 may have a plurality of pieces of data for recovery and each piece of data may be associated with a particular bottle serial number. For example, the plurality of pieces of data for recovery may be stored as "bottle NO. A: 100 not reflected", "bottle NO. B: 250 not reflected". Alternatively, in this embodiment, RAM 210 may not keep the unreflected data X, which is not backed up due to a malfunction in the writing, to save an amount of memory. However, without keeping the unreflected data X, the data may not be recovered completely. To cope with this eventuality, the data in the memory in the main body side and the data in the memory in the bottle side are mirrored to store the same data.

In this embodiment, it is assumed that the toner bottles 301-304 may move between two image forming apparatus, so that the two image forming apparatus are used to explain. In this description of the embodiment, one of two image forming apparatuses is a first image forming apparatus and the other one of two image forming apparatuses is a second image forming apparatus that is the other apparatus.

Figure 4:
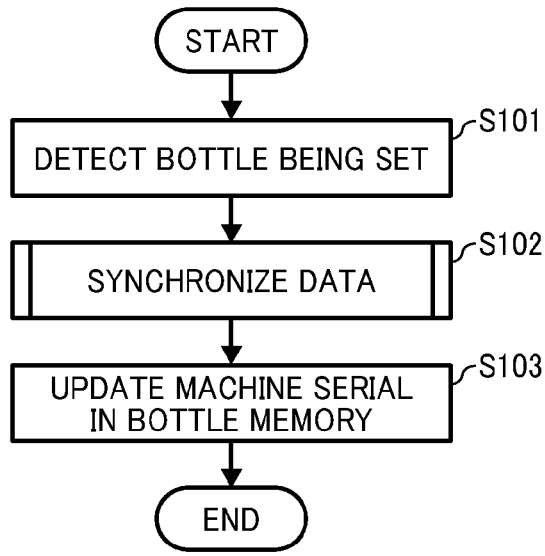
FIG. 4 is a flowchart illustrating a process of data synchronization performed by the engine controller device of the image forming apparatus of FIG. 1 in detecting connection of the toner bottle.

FIG. 4 is a flowchart illustrating a process performed by the engine controller device 105 of the image forming apparatus described above in detecting connection of each of the toner bottles 301-304.

Referring to FIG. 4, the engine controller device 105 detects the toner bottles 301-304 being set in S101. After that, the engine controller device 105 performs processing of data synchronization in S102, which is described in detail later. The engine controller device 105 then overwrites the memory in the bottle side with the machine serial number of the first apparatus, to update the memory in the bottle side at S103 and complete the process. In S103, when the present machine serial number stored in the memory in the bottle side is same as the machine serial number of the first apparatus, the engine controller device 105 may not overwrite the machine serial number.

Figure 5:
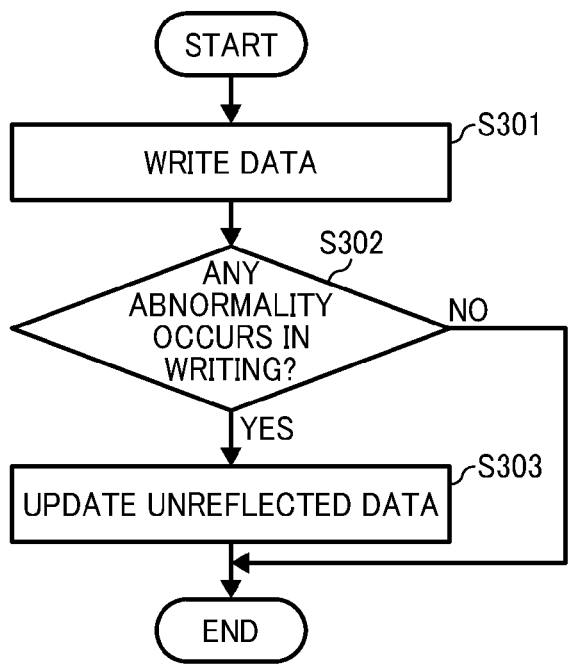
FIG. 5 is a flowchart illustrating a process of writing data to the toner bottle in FIG. 2.

FIG. 5 is a flowchart illustrating a process of writing data to the toner bottles 301-304 described above.

Referring to FIG. 5, the engine controller device 105 writes data to the toner bottles 301-304 at S301. The engine controller device 105 then determines whether abnormality occurs in writing at S302. If there is no abnormality occurring in writing as a result of the determination of S302, the process is completed. If there is a malfunction in the writing as a result of the determination of S302, the engine controller device 105 stores data that fails to be reflected in the memory in the bottle side due to the abnormality in the memory in the main body side to update previous unreflected data, and the process is completed.

FIGS. 6A and 6B are a flowchart illustrating details of the process of data synchronization of S102 in the process illustrated in FIG. 4.

The process of data synchronization includes recovery of data. In 5201, the engine controller device 105 reads the data stored in the memory in the bottle side, which is the EEPROM (A) 401, the EEPROM (B) 402, the EEPROM (C) 403, and the EEPROM (D) 404, and stores the read data, the data of the bottle side to the memory in the main body side, which is the RAM 210. The engine controller device 105 checks the bottle serial numbers and the machine serial numbers by comparing the data between the bottle side and the main body side in S202.

In S203, the engine controller device 105 determines whether both bottle serial numbers match based on the result of the comparison of the data between the bottle side and the main body side. If the bottle serial numbers match as the result of the comparison of S203, the engine controller device 105 determines that the one or more of toner bottles 301-304 presently set are the same as the toner bottles previously set before the detection of the connection. This means that the one or more of the toner bottles 301-304 are reset without being replaced. In this situation, the process continues to S204, and the engine controller device 105 determines whether the machine serial numbers match. If the bottle serial numbers do not match as the result of the comparison of S204, the engine controller device 105 determines that the corresponding one or more toner bottles 301-304 are not the same as before the detection of the connection. This means that the corresponding one or more of the bottles 301-304 are reset after being replaced with new or different bottles. In this situation, the process continues to S210, and the engine controller device 105 determines whether the machine serial numbers match.

As a result of the determination of S204, if the machine serial numbers match, the engine controller device 105 determines that the corresponding one or more of the toner bottles 301-304 have not been used in the second apparatus during their removal. Subsequently, the process continues to S205, and the engine controller device 105 determines whether the abnormality occurs in writing using communication performed right before the corresponding one or more of the toner bottles 301-304 are set. If the machine serial numbers match in the determination of S204, this means that the corresponding one or more of the toner bottles 301-304 have been used in the second apparatus during their removal. That is, more specifically, the corresponding one or more of the toner bottles 301-304 are being returned after being used in the second apparatus, and the first apparatus has not used other toner bottles than the corresponding one or more of the toner bottles 301-304 during their removal. Subsequently, the process continues to S207, and the engine controller device 105 determines whether a malfunction occurs in writing using the communication performed right before the corresponding one or more of the toner bottles 301-304 are set. As a result of the determination of S205, when there is no abnormality occurring in writing using the communication performed right before the corresponding one or more of the toner bottles 301-304 are set, the engine controller device 105 determines that the data in the main body side and the data in the bottle side match and completes the process.

In contrast, if there is a malfunction in the writing, the engine controller device 105 performs the data synchronization between the memories by copying the data from the memory in the main body side to the memory in the bottle side to overwrite the memory in the bottle side in S206. The engine controller device 105 then completes the process after the corresponding one or more of the toner bottles 301-304 are reset to the image forming apparatus to eliminate the abnormality.

When there is a malfunction in the writing using the communication performed right before the corresponding one or more of the toner bottles 301-304 are set, the engine controller device 105 determines that the data of the memory in the main body side is not backed up to the memory in the bottle side and the data in the bottle side has been updated by being used in the second apparatus during the removal. According to the determination described above, the engine controller device 105 performs the data synchronization between memories in the main body side and the bottle side by copying the data from the memory in the bottle side to the memory in the main body side to overwrite, and adds the unreflected data that is kept in the different area of the memory in the main body side to recover the data in S208 to complete the process. Even when the determination of S207 determines that there is no abnormality occurring in writing, the engine controller device 105 determines that the memory in the bottle side has been updated by being used in the second apparatus and thus has correct data. The engine controller device 105, accordingly, performs the data synchronization between the memories in the main body side and the bottle side by copying the data from the memory in the bottle side to the memory in the main body side to overwrite in S209 and completes the process.

As a result of the determination of S210, which determines whether the machine serial numbers match, if a data inconsistency in the machine serial numbers is detected, the engine controller device 105 determines that the corresponding one or more toner bottles 301'-304' are new, or not previously used in the first apparatus. The engine controller device 105 then performs data synchronization between the memories in the main body side and the bottle side by copying the data in the bottle side to the memory in the main body side to overwrite in S209 and completes the process. If the machine serial numbers match, the engine controller device 105 determines that the one or more corresponding toner bottles 301-304 have not been used in the second apparatus. More specifically, the engine controller device 105 determines that the one or more corresponding toner bottles 301-304 have once been removed and other one or more of toner bottles 301'-304' are set to the first apparatus to be used and the corresponding one or more of toner bottles 301-304 are not used in the second apparatus while they were removed from the first apparatus. Subsequently, the process continues to S211, and the engine controller device 105 determines whether the abnormality occurs in writing during communication last-performed right before the corresponding one or more of toner bottles 301-304 are set. As a result of the determination of S211, if there is a malfunction, this means that the data in the memory in the main body side is not backed up to the memory in the bottle side, and the data in the memory in the bottle side has been updated by being used in the second apparatus. The engine controller device 105 then performs the data synchronization by copying the data from the memory in the bottle side to the memory in the main body side to overwrite, and then adds the unreflected data that is differential data in the memory in the main body side to perform data recovery in S212, and completes the process. As a result of the determination of S211, if there is a malfunction, this means that the data in the memory in the main body side is not backed up to the memory in the bottle side, and the data in the memory in the bottle side is not updated due to not being used in the second apparatus, which is different from S208. In this case, the engine controller device 105 determines the data in the memory in the main body side is overwritten with the other corresponding toner bottles 301'-304', so that performs the data synchronization by copying the data in the memory in the bottle side to the memory in the main body side to overwrite, and then adds the unreflected data, which is differential data stored in the different area, to recover data in S213.

The data synchronization including the recovery of the data performed by the engine controller device 105, described above, is summarized in Table 1 below.

In the embodiment described above, to determine whether one or more of toner bottles 301-304 are used in the second apparatus, each bottle serial number of the toner bottles 301-304, and the machine serial number of the main bodies of the first apparatus and the second apparatus are used. However, the disclosure is not limited to this, but any other desired information may be used, as long as the information can identify each of the toner bottles 301-304 and the main bodies of the first apparatus the second apparatus.

According to the image forming apparatus of the embodiment described above, the memory in the main body side, which is the RAM 210 connected to the the CPU 204 of the engine controller device 105, and the memory in the bottle side, which is detachably connected to the CPU 204 of the main body, individually store the serial number of the main body and the serial number of each of the toner bottles 301-304 set to the main body, in setting the corresponding one or more of toner bottles 301-304 to the main body and thereby reading the data from the memory in the bottle side, which includes the EEPROM (A) 401, the EEPROM (B) 402, the EEPROM (C) 403, and the EEPROM (D) 404. The CPU 204 reads the control data including the bottle serial number and the machine serial number from the memory in the bottle side in detecting setting one or more of the toner

TABLE 1

| No. | Bottle Serial Number | Machine Serial Number | Abnormality in Writing | Case Example | Method of Data Synchronization/Recovery |
|---|---|---|---|---|---|
| 1 | same | same | No | No bottle is removed. The data in both memories is correct. | The data synchronization is not necessary. |
| 2 | | | Yes | No bottle is removed. The data in the bottle memory is not correct. | Overwriting the bottle memory by copying the data from the main body memory to the bottle memory. |
| 3 | | different | No | Bottle(s) previously used in the first apparatus is(are) returned after being used in the second apparatus. The data in the bottle memory is correct. | Overwriting the main body memory by copying the data from the bottle memory to the main body memory. |
| 4 | | | Yes | The writing abnormality occurs in the first apparatus and the bottle(s) having incorrect data is(are) used in the second apparatus and then returned to the first apparatus. | Overwriting the main body memory by copying the data from the bottle memory to the main body memory. Adding unreflected data in a different area, and then overwriting the bottle memory with the data including the added unreflected data in the main body memory. |
| 5 | different | same | No | The bottle(s) are replaced with other bottle(s) and the first apparatus uses the other bottle(s), and then the bottle(s) are returned to the first apparatus without being used in the second apparatus. The data in the bottle memory is correct | Overwriting the main body memory by copying the data from the bottle memory to the main body memory. |
| 6 | | | Yes | A malfunction in the writing occurs in the first apparatus, the bottle(s) is(are) replaced with other bottle(s) and the first apparatus uses the other bottle(s), and then the bottle(s) is(are) returned to the first apparatus without being used with the second apparatus. | Overwriting the main body memory by copying the data from the bottle memory to the main body memory. Adding unreflected data in a different area, and then overwriting the bottle memory with the data including the added unreflected data in the main body memory |
| 7 | | different | No | New bottle(s) is(are) set, or bottle(s) not previously used in the first apparatus but the second apparatus is(are) set. | Overwriting the main body memory by copying the data from the bottle memory to the main body memory. |
| 8 | | | Yes | no case example | no case example | bottles 301-304 to the main body and determines whether the corresponding one or more of the toner bottles 301-304 are used in the other apparatus before being connected to the present apparatus. The CPU 204 then use the data having a high reliability stored in one of the memory in the main body and the memory in the bottle side based on a result of the determination weather the corresponding one or more of the toner bottles 301-304 are used in the other apparatus. In addition, the CPU 204 can cope with a case in which the one or more of toner bottles 301-304 are once removed from the first apparatus and used in the second apparatus, and then returned to the first apparatus by using data that does not cause any damage, to correctly update the data.

The function to manage the status information of the toner bottles used in the image forming apparatus to which the toner bottles are set (the data synchronization including recovery performed by the engine controller device 105, as described with reference to FIG. 6) is also embodied as a method of managing the status information of a removable device set to an electronic apparatus.

More specifically, the method of managing status information in an electronic apparatus to which a removable device is set involves storing first status information indicating a status of the removable device, first identification information identifying the removable device, and second identification information identifying one of the electronic apparatus and other electronic apparatus to which the removable device is last-set, storing second status information indicating a status of the removable device that is set to the electronic apparatus, third identification information identifying the removable device set to the electronic apparatus, and fourth identification information identifying the electronic apparatus in a second memory in the electronic apparatus, and determining whether the first identification information matches the third identification information and the second identification information matches the fourth identification information and updating the second status information with the first status information based on the determination.

Although the exemplary embodiments of the disclosure have been described and illustrated above, such description is not intended that the disclosure be limited to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. An electronic apparatus configured to accept a removable device, the removable device including a first memory configured to store first status information indicating a status of the removable device, first identification information identifying the removable device, and second identification information identifying a last electronic apparatus to which the removable device has last been set, the last electronic apparatus being one of the electronic apparatus and another electronic apparatus, the electronic apparatus comprising:

a second memory configured to store second status information indicating the status of the removable device that is set to the electronic apparatus, third identification information identifying the removable device set to the electronic apparatus, and fourth identification information identifying the electronic apparatus; and a processor configured to, determine, when connected to the first memory of the removable device set to the electronic apparatus, whether the first identification information matches the third identification information and the second identification information matches the fourth identification information to generate a determination result, and synchronize the second status information and the first status information by performing, based on the determination result, different ones of (i) updating the first status information based on the second status information, (ii) updating the second status information based on the first status information, and (iii) updating both the first status information and the second status information based on the first status information and the second status information, wherein the processor is configured to update both the first status information and the second status information when (i) an abnormality occurs in writing data to the first memory of the removable device and (ii) one or more of the first identification information does not match the third identification information or the second identification information does not match the fourth identification information, the processor being configured to update both the first status information and the second status information by, storing, in the second memory, failed data, the failed data being the data associated with the abnormality, and updating the first status information and the second status information by overwriting the second status information based on the first status information to generate intermediate status information, updating the intermediate status information by adding the failed data to the intermediate status information to generate final status information, and updating the first status information based on the final status information.

2. The electronic apparatus of claim 1, wherein the processor is configured to update the first status information and the second status information by reflecting the failed data in the first status information.

3. An electronic apparatus configured to accept a removable device, the removable device including first means for storing first status information indicating a status of the removable device, first identification information identifying the removable device, and second identification information identifying a last electronic apparatus to which the removable device has last been set, the last electronic apparatus being one of the electronic apparatus and another electronic apparatus, the electronic apparatus comprising:

second means for storing second status information indicating the status of the removable device that is set to the electronic apparatus, third identification information identifying the removable device set to the electronic apparatus, and fourth identification information identifying the electronic apparatus; and means for controlling the electronic apparatus by, determining, when connected to the first means for storing in the removable device set to the electronic apparatus, whether the first identification information matches the third identification information and the second identification information matches the fourth identification information to generate a determination result, and synchronizing the second status information and the first status information by performing, based on the determination result, different ones of (i) updating the first status information based on the second status information, (ii) updating the second status information based on the first status information, and (iii) updating both the first status information and the second status information based on the first status information and the second status information, wherein the means for controlling updates both the first status information and the second status information when (i) an abnormality occurs in writing data to the first means for storing of the removable device and (ii) one or more of the first identification information does not match the third identification information or the second identification information does not match the fourth identification information, the means for controlling updating both the first status information and the second status information by, storing, in the second means for storing, failed data, the failed data being the data associated with the abnormality, and updating the first status information and the second status information by overwriting the second status information based on the first status information to generate intermediate status information, updating the intermediate status information by adding the failed data to the intermediate status information to generate final status information, and updating the first status information based on the final status information.

4. The electronic apparatus of claim 3, wherein the means for controlling updates the first status information and the second status information by reflecting the failed data in the first status information.

5. A method of managing status information in an electronic apparatus to which a removable device is set, the removable device including a first memory configured to store first status information indicating a status of the removable device, first identification information identifying the removable device, and second identification information identifying a last electronic apparatus to which the removable device has last been set, the last electronic apparatus being one of the electronic apparatus and another electronic apparatus, the method comprising:

storing, in a second memory of the electronic apparatus, second status information indicating the status of the removable device that is set to the electronic apparatus, third identification information identifying the removable device set to the electronic apparatus, and fourth identification information identifying the electronic apparatus; and determining, when the removable device is set to the electronic apparatus, whether the first identification information matches the third identification information and the second identification information matches the fourth identification information to generate a determination result; and synchronizing the second status information and the first status information by performing, based on the determination result, different ones of (i) updating the first status information based on the second status information, (ii) updating the second status information based on the first status information, and (iii) updating both the first status information and the second status information based on the first status information and the second status information, wherein the synchronizing updates both the first status information and the second status information when (i) an abnormality occurs in writing data to the first memory of the removable device and (ii) one or more of the first identification information does not match the third identification information or the second identification information does not match the fourth identification information, the synchronizing updating both the first status information and the second status information by, storing, in the second memory, failed data, the failed data being the data associated with the abnormality, and updating the first status information and the second status information by overwriting the second status information based on the first status information to generate intermediate status information, updating the intermediate status information by adding the failed data to the intermediate status information to generate final status information, and updating the first status information based on the final status information.

6. The electronic apparatus of claim 1, wherein the processor is configured to synchronize the second status information with the first status information by, updating the first status information based on the second status information, in response to the abnormality in writing data to the first memory of the removable device, the first identification information matching the third identification information and the second identification information matching the fourth identification information, and updating the second status information based on the first status information, in response to a normal operation in writing the data to the first memory of the removable device and one or more of the first identification information not matching the third identification information and the second identification information not matching the fourth identification information.

7. The electronic apparatus of claim 6, wherein the processor is configured to synchronize the second status information with the first status information by updating both the first status information and the second status information based on the first status information and the second status information in response to the abnormality in writing the data to the first memory of the removable device and one or more of the first identification information not matching the third identification information and the second identification information not matching the fourth identification information.

8. The electronic apparatus of claim 3, wherein the means for controlling synchronizes the second status information with the first status information by, updating the first status information based on the second status information, in response to the abnormality in writing data to the first means for storing of the removable device, the first identification information matching the third identification information and the second identification information matching the fourth identification information, and updating the second status information based on the first status information, in response to a normal operation in writing the data to the first means for storing of the removable device and one or more of the first identification information not matching the third identification information and the second identification information not matching the fourth identification information.

9. The electronic apparatus of claim 8, wherein the means for controlling synchronizes the second status information with the first status information by updating both the first status information and the second status information based on the first status information and the second status information in response to the abnormality in writing the data to the first means for storing of the removable device and one or more of the first identification information not matching the third identification information and the second identification information not matching the fourth identification information.

10. The method of claim 5, wherein synchronizing synchronizes the second status information with the first status information by, updating the first status information based on the second status information, in response to the abnormality in writing data to the first memory of the removable device, the first identification information matching the third identification information and the second identification information matching the fourth identification information, and updating the second status information based on the first status information, in response to a normal operation in writing the data to the first memory of the removable device and one or more of the first identification information not matching the third identification information and the second identification information not matching the fourth identification information.

11. The method of claim 10, wherein synchronizing synchronizes the second status information with the first status information by updating both the first status information and the second status information based on the first status information and the second status information in response to the abnormality in writing the data to the first memory of the removable device and one or more of the first identification information not matching the third identification information and the second identification information not matching the fourth identification information.

* * * * *